United States Patent [19]

Schwiebert

[11] 3,740,073

[45] June 19, 1973

[54] TRAILER WINCH

[76] Inventor: Phillip D. Schwiebert, 599 Greenleaf, Glencoe, Ill. 60022

[22] Filed: July 29, 1971

[21] Appl. No.: 167,230

[52] U.S. Cl....... 280/179 A, 105/369 A, 248/361 A
[51] Int. Cl............................................. B60p 7/08
[58] Field of Search................... 280/179 R, 179 A, 280/179 B; 248/228, 361 A; 105/369 A, 368 T

[56] References Cited
UNITED STATES PATENTS
3,633,937   1/1972   Hlinsky.......................... 280/179 A Primary Examiner—Richard J. Johnson
Assistant Examiner—David M. Mitchell
Attorney—John J. Held, Jr.

[57] ABSTRACT

The improved trailer winch disclosed herein is adapted to be mounted on the channel side rail of a trailer and to be utilized to assist in securing loads to the deck of a trailer. The means for mounting the winch on the channel side rail of the trailer allows the winch to be slidably moved with respect to and along the channel side rail of the trailer so that the winch can be selectively positioned with respect to the load to be secured. The winch mounting means also prevents removal of the winch from the channel side rail of the trailer. The winch is constructed so that it does not project beyond the maximum permissible eight foot width clearance of the trailer and so that it may be operated by a person standing on the ground next to the trailer.

8 Claims, 9 Drawing Figures

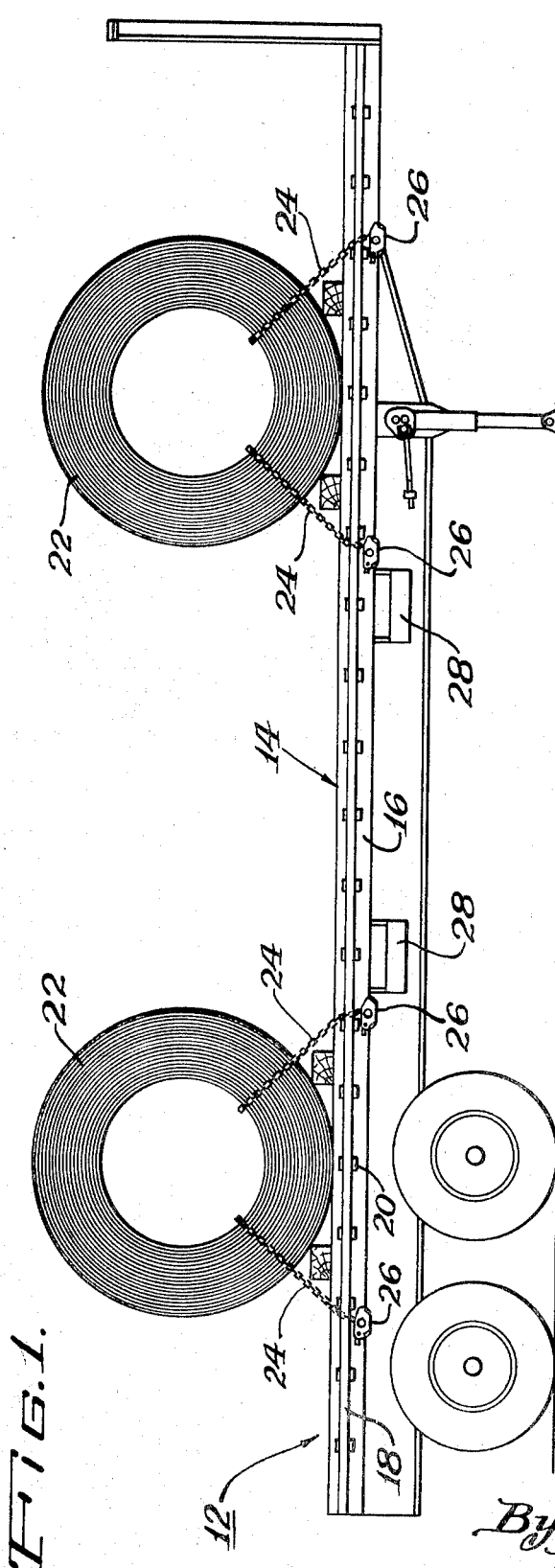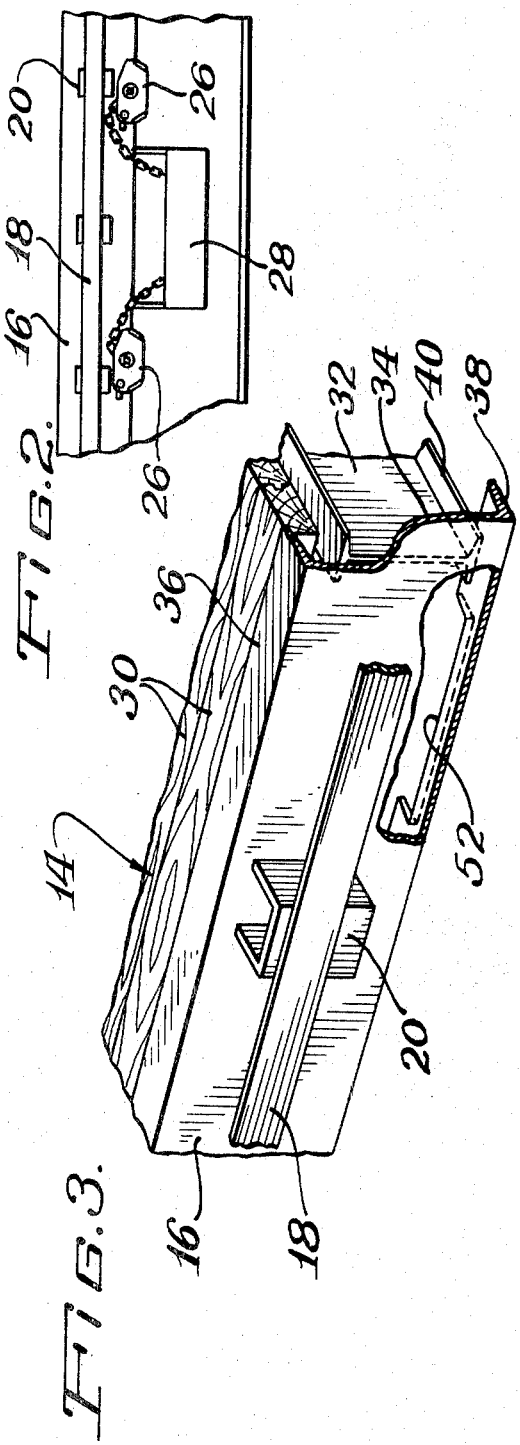

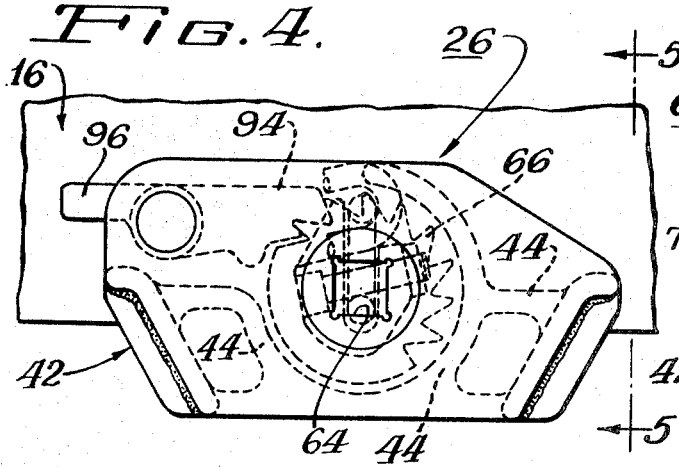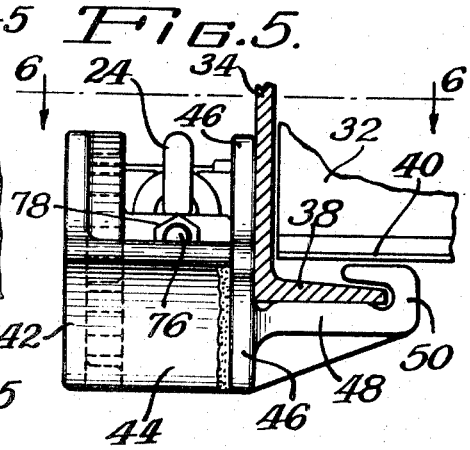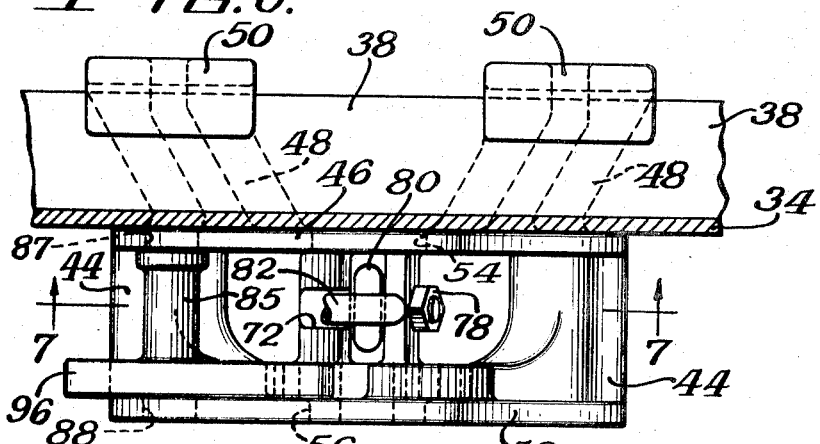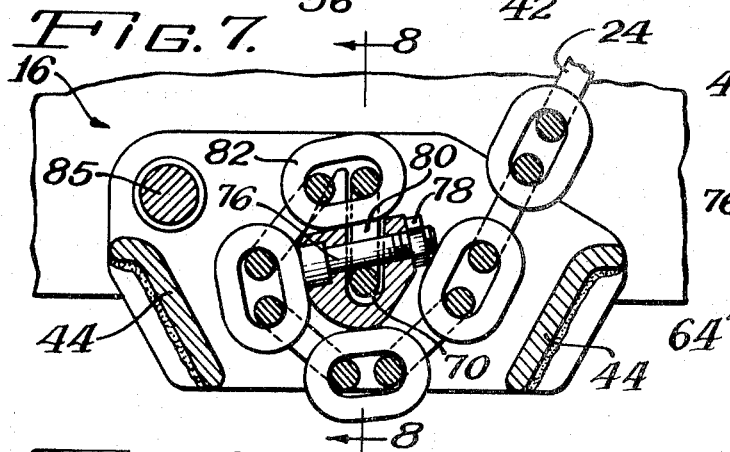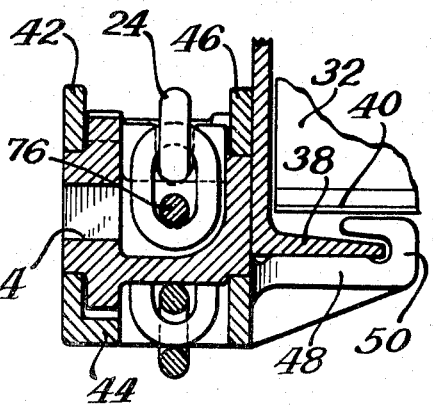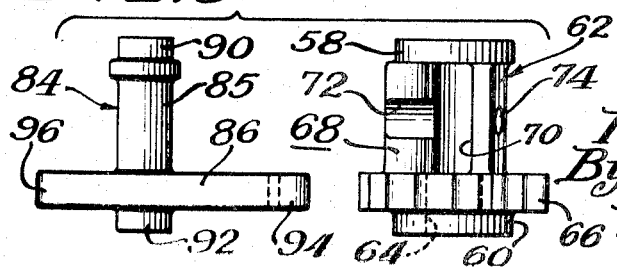

TRAILER WINCH

BACKGROUND AND SUMMARY OF THE INVENTION

The present invention relates to an improved winch for securing loads on the deck of a trailer, and more particularly, to an improved winch which is adapted to be securely mounted on the channel side rail of the trailer such that the winch may be selectively moved with respect to and along the channel side rail.

While it has long been common practice to utilize chain binders to tighten and secure the chains used to secure loads to the deck of a trailer, it has generally been recognized that there are disadvantages with respect to the use of such chain binders. Frequently, a person is required to climb onto the deck of the trailer to initially tension and secure the binders, and to retension the binders en route. Such binder tensioning can be a relatively dangerous operation as well as being inconvenient and laborous. Furthermore, en route adjustments of the binders may also require time-consuming removal of the load covering tarp.

Another disadvantage is that chain binders are subject to tampering, and there is a serious problem of chain binder theft because the binders are not permanently secured to the trailer.

Also, in the past, winches have been welded, or otherwise permanently secured, at spaced intervals, along the channel side rail of a trailer. These winches have been utilized to tighten the chains used to secure loads on the trailers. However, because the winches are welded to the channel side rail, it was difficult to use them since they could not be moved to accommodate different loading combinations. Moreover, because of the limitations as to the overall width of the trailer, this type of winch was welded to the underside or bottom flange of the channel side rail and extended downwardly from the channel side rail. This position was particularly susceptible to road dirt and debris which made for difficult operation.

In contrast, the improved winch of the present invention is adapted to be mounted on the channel side rail of the trailer so as to be able to be selectively moved with respect to and along the channel side rail and thereby accommodate a variety of loads. Moreover, because of the manner by which the improved winch is mounted on the channel side rail of the trailer, it cannot, as a practical matter, be stolen or otherwise removed from the trailer.

The improved winch of the present invention has a compact and rugged construction which, because of its simplicity, is relatively inexpensive to manufacture and maintain and which permits the improved winch to be mounted on the side of the channel side rail without having the winch project beyond the maximum permissible width clearance of the trailer. As a result, the winch may be operated, and thus the chains connected thereto may be tensioned, by a person standing on the ground and without the necessity of the person climbing on the deck of the trailer. Furthermore, because the improved winch is operated by a tool that is removed when not in use, it is difficult for anyone to tamper with the winch.

Thus, the utilization of the improved winch of the present invention results in faster and safer load securement on a trailer. And because of the relatively low cost of manufacture and maintenance and because there is no chance that the improved winch will be stolen or otherwise lost the winch system offers long term cost benefits to the user. Lastly, the improved winch of the present invention operates in compliance with all applicable sections of the Bureau of Motor Carrier Safety Regulations of the Department of Transportation.

Accordingly, it is a primary object of the present invention to provide an improved winch adapted to be mounted on the channel side rail of a trailer by a novel means such that the winch may be selectively moved with respect to and along the channel side rail but cannot be removed from the channel side rail.

Another object of the present invention is to provide an improved winch of the type described wherein the winch is adapted to be positioned along the side of the channel side rail, but wherein the winch does not project beyond the permissible width clearance of the trailer; wherein the winch is operated by a person standing next to the trailer by the use of a tool that is removed when not in use; and wherein the winch is relatively inexpensive to manufacture and maintain and has a rugged construction.

These and other objects and advantages of the present invention will become apparent to those skilled in the art from a reading of the following specification and a review of the drawings.

DESCRIPTION OF THE DRAWINGS

FIG. 1 is a side plan view of a trailer that has a plurality (four being shown) of winches embodying the present invention mounted thereon, with the winches being shown securing two coils to the deck of the trailer;

FIG. 2 is an enlarged view of a part of the side of the trailer shown in FIG. 1 showing how the chains utilized with the winches embodying the present invention may be stored when not in use;

FIG. 3 is a partial perspective view of a part of the deck, channel side rail and side rub-rail of the trailer shown in FIG. 1;

FIG. 4 is a side plan view of a winch embodying the present invention, with the winch being shown mounted on a channel side rail of a trailer, like the trailer in FIG. 1, and with parts of the winch being shown in dotted lines;

FIG. 5 is an end view of the winch shown in FIG. 4 taken along line 5—5 in FIG. 4;

FIG. 6 is a top plan view of the winch shown in FIG. 4 taken along line 6—6 in FIG. 5;

FIG. 7 is a vertical cross-sectional view of the winch shown in FIG. 4 taken along line 7—7 in FIG. 6;

FIG. 8 is a vertical cross-sectional view of the winch shown in FIG. 4 taken along line 8—8 in FIG. 7; and FIG. 9 is a top, partially exploded view of the pawl and winch drum utilized in the winch shown in FIGS. 4-8.

The same reference numerals have been utilized to identify the same or like parts and assemblies throughout FIGS. 1 through 9. For ease of description, the terms "inner" and "inwardly," and "outer" and "outwardly" have been utilized in the specification to describe relative parts of the improved winch of the present invention, and these terms have been used with reference to the longitudinal axis or center line (or to a vertical plane including the longitudinal axis or center line) of the trailer on which the improved winch is mounted. Likewise, the terms "left" and "right" have been utilized with reference to the directions indicated to a person when viewing the Figures.

DESCRIPTION OF THE PREFERRED EMBODIMENT

As noted above, the improved winch of the present invention is particularly adapted to be mounted on a conventional trailer and such a trailer is indicated generally at 12 in FIG. 1. The trailer 12 is of standard design and construction, except as noted hereinbelow, and includes a generally flat, horizontal deck 14. A conventional channel side rail 16 serves to define the side margins of the deck 14. A conventional side rub-rail 18 is spaced outwardly from channel side rail 16 and defines the outer side dimensions of the trailer 12. A plurality of conventional stake pockets 20 are secured at regularly spaced intervals along the channel side rail 16 and between the channel side rail and the side rub-rail 18, with the side rub-rail 18 being secured to the outer sides of the stake pockets. The stake pockets 20 are utilized to perform their normal function as the attachment point for chain assemblies or receiving and holding the stakes on side panels, not shown, when side panels are used with the trailer.

The trailer 12 may be utilized to transport various loads, such as the coils 22. During transit, the coils 22 are secured to the deck 14 of the trailer by conventional chains, four of which are shown at 24. Winches which embody the present invention and which are shown generally at 26 are mounted on the channel side rail 16, as hereinafter described, and each of the winches 26 has one end of one of the chains 24 secured thereto. The other ends of the chain 24 may be secured directly to the coils 22 or to the opposite stake pockets.

A pair of metal containers 28 are secured on each side of the trailer 12 under the deck 14 of the trailer. As best shown in FIG. 2, these containers 28 are used to receive the free, other ends of the chain 24 when they are not in use. Even though the other ends of the chains 24 are not secured to the containers 28, the chains 24 cannot, as a practical matter, be stolen or otherwise removed from the trailer 12 because the one end of the chains is fastened, at all times, to the winches 26, and the winches are securely mounted on the trailer 12, as hereinafter described. When containers are not provided, as is frequently the case, chains are secured across the deck on empty movement of the trailer.

With reference to FIG. 3, the deck 14 of the trailer consists of a plurality of wooden planks 30 which are supported at regularly, spaced intervals by a plurality of cross-members 32. The cross-members extend from one side of the deck 14 to the other, and are arranged so that their longitudinal axes are perpendicular to the longitudinal axis of the trailer 12. The channel side rail 16 includes a vertical body 34, an upper inwardly directed flange 36, and a lower inwardly directed flange 38. The inner end of the upper flange 36 abuts the adjacent plank 30 of the deck 14. In trailers such as trailers 12, the lower surface of the lower flange 40 of the cross-member 32 is commonly spaced above the upper surface of the lower flange 38 of the channel side rail 16, as best seen in FIGS. 3, 5, and 8. This distance is normally approximately eleven-sixteenths inch, and it is this distance or gap between the flanges 38 and 40 which permits the winches 26 to be moved along the channel side rail 16 as hereinafter more fully described.

As noted above, four winches 26 are shown in FIG. 1 mounted on the channel side rail 16 of the trailer 12. The winches 24 are structurally and functionally identical, and for this reason, only one of the winches 26 will be described in detail.

Referring now to FIGS. 4 through 9, improved winch 26 of the present invention includes an outer housing plate 42 which has a plurality of inwardly directed projections 44 integrally formed inwardly thereon, with the plane of the projections 44 being generally perpendicular to the plane of the housing plate 42.

Slide plate 46 is spaced inwardly from the outer housing plate 42 and is secured to the inner ends of the projections 44 by welding or the like so that the planes of the plates 42 and 46 are parallel. When the winch 26 is mounted on the trailer 12, the slide plate 46 is positioned adjacent to the body 34, near its lower end, as best shown in FIGS. 5, 6, and 8, so that the planes of the plate 46 and the body 34 are generally parallel. A pair of inwardly directed arms 48 are integrally formed on the inner surface of the slide plate 46 and are used to mount the winch 26 on the channel side rail 16. Each of the arms 48 has its projecting end 50 formed or bent into a U-shaped, in vertical cross-section, configuration, with the "U" being above the plane of the arm 48 and being arranged so that the open end of the U faces outwardly when the winch is mounted on the trailer 12. The distance from the plane of the slide plate 46 and its U-shaped ends is selected so that it is slightly greater than the width of the flange 38 of the channel side rail whereby the flange 38 can be positioned or fit within and between slide plate 46 and the U-shaped ends 50 of its arms 48, as best illustrated in FIGS. 5 and 8.

The arms 48 are each formed on the slide plate 46 so that the arms 48 generally lie in the same plane which is perpendicular to the plane of the plate 46, so that the longitudinal axes of the arms each form an acute angle with the plane of the plate 46, and so that the longitudinal axes of the arms 48 intersect at a point spaced outwardly from the plane of the side plate 46, as best illustrated in FIGS. 5 and 6. Preferably, each of the arms 48 are disposed so that their longitudinal axis forms an angle of approximately 60° with respect to the plane of the slide plate 46. This arrangement of the arms 48 distributes the forces imposed by the winch 26 on the flange 38 over a wider area of the flange, and thus prevents bending of the flange as a result of the usage of the winch.

In order to initially mount the winch 26 on the channel side rail, a portion 52 of the flange 38 of the rail is cut away, as seen in FIG. 3. The length of this portion 52 is slightly longer than the distance between the ends 50 of the two arms 48 on the winch 26 and may be cut away by a torch, or the like. The winch 26 is placed in a position such as shown in FIGS. 4 and 5, adjacent to the cut away portion 52, and thereafter, is slid along the channel side rail 16 in a direction parallel to the longitudinal axis of the rail 16 until both ends 50 of the arms 48 overly the inner end of the flange 38. The cut away portion 52 is then blocked off so that the winch 26 cannot be removed from the channel side rail 16 through the portion 52. In practice, the portion 52 is usually cut into the channel side rail 16 adjacent to one end of the trailer 12.

Referring now to FIGS. 4 through 9, aligned, centrally disposed apertures 54 and 56 are formed in the plates 46 and 42, respectively. End portions 58 and 60 of a winch drum 62 are disposed in these apertures 54 and 56, respectively, so that the winch drum may be rotated with respect to the plates 42 and 46. The overall width of the drum 62, in a direction perpendicular to the longitudinal axis of the trailer 12, is such that the end portions 58 and 60 of the drum do not project beyond the planes of the plates 46 and 42, respectively.

The outer face of the end portion 60 has a recess 64 formed therein for receiving a tool, such as a conventional three-quarter inch socket wrench, which may be utilized to rotate the drum 62 about its longitudinal axis which is perpendicular to the planes of the plates 42 and 46. A plurality of teeth are formed about the outer periphery of the drum 62 adjacent to the end portion 60. Although the number of teeth formed is not critical, it has been found that when 15 teeth are formed, a very satisfactory incremental chain takeup results. The winch drum 62 also has a chain securement portion 68 disposed between the teeth 66 and the end portion 58. The portion 68 includes a recess 70 which has a generally oval cross-section and which is formed so that its major axis extends in a direction parallel to the longitudinal axis of the drum 62 and so that a link of the chain 24 can be disposed therein. A cast slot 72 is formed across the top portion of the drum so that it intersects the upper end, as shown in FIG. 7, of the recess 70 and so that its axis is disposed transversely to the major axis of the recess 70. An aperture 74 is drilled through the drum 62 so that the aperture intersects the recess 70 below the slot 72. The axis of the aperture 74 is generally parallel to the axis of the slot 72. The aperture 74 is counterbored at one end, and the socket head of a cap screw 76 is disposed within this counterbored portion. A lock nut 78 is used to maintain the cap screw 76 within the aperture 74.

As illustrated in FIG. 7, one end of the chain 24 is fastened to the securement portion 68 of the winch drum 62 in the following manner: the lock nut 78 is unscrewed and the cap screw 76 is removed from the winch drum 62. The end link 80 of the chain 24 is then disposed or placed within the recess 70, and the next or second link 82 of the chain 24 is placed within the slot 72. The cap screw 76 is re-introduced into the aperture 74 and is secured in place by the lock nut 78. The aperture 74 is drilled so that when the link 80 is placed in the recess 70, the cap screw 76 extends between the ends of the link 80, and thus the link 80 is secured within the recess 70 by the screw 76. As best shown in FIGS. 6 and 7, the projections 44 are sufficiently spaced from the winch drum 62 that the chain 24 can be wrapped around the winch drum 62 as a result of rotation of the drum 62 about its longitudinal axis.

The winch 26 also includes a pawl 84 which is utilized to selectively prevent rotational movement of the winch drum 62 in the counterclockwise direction and which includes a shaft 85 and an integral arm 86. The second pair of aligned apertures 87 and 88 are formed in the upper left-hand corner of the plates 46 and 42, respectively, and are adapted to receive the end portions 90 and 92 of the shaft 85 of the pawl 84 so that the shaft 85 may be rotated with respect to the plates 42 and 46. The longitudinal axis of the shaft 85 of the pawl 84 is generally parallel to, but spaced from the longitudinal axis of the winch drum 62. The width of the shaft 85 of the pawl 84, in a direction perpendicular to the planes of the plates 42 and 46, is such that the end portions 90 and 92 of the shaft do not project beyond the planes of the plates 42 and 46. As noted above, the pawl 84 includes an integral arm 86 which extends transversely to the longitudinal axis of the shaft 85 of the pawl. The arm 86 is formed so that its longitudinal axis is off-set above a plane which includes the longitudinal central axes of the shaft 85 and the drum 62, and the right end 94 of the arm 86 is formed so as to be selectively engageable with preferably two of the teeth 66 formed on the drum 62. The left end 96 of the arm 86 extends beyond the left ends of the plates 42 and 46 and is used to release the right end 94 of the pawl from engagement with the teeth 66. More specifically, a downward force on the left end 96 of the arm 86 results in a counterclockwise, rotational movement of the arm 86 about the longitudinal axis of the shaft 85, and this rotational movement causes the right end 94 of the arm 86 to be moved out of engagement with the teeth 66 on the drum 62. As long as the end 94 is not in engagement with the teeth 66, the drum 62 may be rotated in both a clockwise and a counterclockwise direction. However, when the end 94 of the arm 86 of the pawl is engaged with the teeth 66, the drum 62 may be rotated only in a clockwise direction.

Thus, when the winch 26 is used to secure a load on the trailer 12, the chain 24 is wound about the drum 62 by rotating the drum in a clockwise direction and is unwound from the drum by rotating the drum in a counterclockwise direction. The right end 94 of the arm 86 is heavier than the left end 96 so that the end 94 of the arm 86 remains in engagement with the teeth 66 of the winch drum 62 unless a downward force is applied to the left end 96 of the arm.

From the foregoing it is apparent that once the winch 26 has been mounted on the channel side rail 16, by means of the cut away portion 52 described above, the winch 26 is free to slide along the channel side rail 16 (more particularly along the flange 38) so that it can be selectively positioned along the channel side rail for best securement of a load on the trailer. When the load to be secured on the trailer has an irregular shape, such as the coils 22, the winches 26 can be positioned near a stake pocket 20 so that the chains 24 can be brought around the opposite side of the stake pocket and then secured to the load. This positioning of the winches 26 adjacent to a stake pocket 20 prevents the winches 26 from sliding longitudinally during transit.

The winch 26 can be constructed so that the overall width, i.e., the distance between the outer face of the plate 42 and the inner face of the plate 46, is the same as the distance between the side rub-rail 18 and the body 34 of the channels side rail 16. Thus, the winch 26 is generally flush with the plane of the side rub-rail 18, and the use of the winch 26 will not exceed the maximum permissible overall width of the trailer. Furthermore, the winch 26 may be designed so as to have as much as twelve inches of incremental chain takeup which is roughly equal to three times that of the present chain binders. This results in tighter chains and improved load securement with no rehooking of the chains required en route to further tighten the chains. Also, as noted above, the chains may be tensioned from ground level by use of a socket wrench which fits within the aperture 64, and this arrangement makes the secured load much less susceptible to tampering.

The unique mounting means utilized by the winches 26 prevents, as a practical matter, the winches from being stolen or otherwise removed from the trailer and this, of course, results in a considerable savings to the trailer owner.

Finally, it should be noted that the improved winch 26 of the present invention could, if desired, be welded to the side channel rail 16, with the arms 48 being positioned beneath and welded to the flange 38 of the rail 16. Obviously, when the winch 26 is welded to the side channel rail 16, it cannot be slid along the rail 16. Furthermore, rather than using the chain 24 with the winch 26, a cable or nylon strap could be utilized instead. Therefore, while a detailed description of the preferred embodiment of the present invention has been provided hereinabove, it is to be understood that all equivalents obvious to those having ordinary skill in this art are to be included in the scope of the invention as claimed.

I claim:

1. For use in securing loads on a trailer having a deck supported by cross-members and having a channel side rail which is positioned along and defines a side of the deck of the trailer and which has a substantially vertically disposed side and a lower, inwardly directed with respect to the longitudinal axis of the trailer, flange spaced a distance below the bottom of the ends of the cross-members, an improved winch which is adapted to be securely mounted on and selectively, adjustably, slidably positioned along the channel side rail and which is utilized, together with a chain, or the like, to secure loads on the deck of the trailer, the improved winch comprising: housing means having first member and second member, with a member being adapted to be positioned adjacent to the lower portion of the side of the channel side rail; means for securely mounting the housing means on the lower flange of the channel side rail so that the housing means may be adjustably and selectively moved with respect to and along the channel side rail in a direction parallel to the longitudinal axis of the channel side rail, the means for mounting the housing means including at least one arm which is mounted on the housing means, which is adapted to extend, at least in part, beneath the flange of the channel side rail inwardly toward the longitudinal axis of the trailer and which has at least a portion that has a thickness less than said distance and that extends between the flange and the bottom of the end of the cross-member; rotatable winch drum means carried by the housing means; means for securing an end of a chain or the like to the winch drum means so that rotation of the winch drum means in one direction results in the chain being wound about the winch drum means; and pawl means carried by the housing means and arranged so as to permit rotation of the winch drum means in said one direction and to selectively present rotation of the winch drum means in the opposite direction.

2. The improvement described in claim 1 wherein the inner terminal end of the arm is generally U-shaped, in vertical cross-section, with the open end of the U-shaped recess thus formed facing outwardly toward the housing means; and wherein the distance between the member of the housing means positioned adjacent to the lower portion of the side of the channel side rail and the inner, closed end of said U-shaped recess is slightly greater than the width of the flange of the channel side rail and the dimensions of said U-shaped recess are such that the inner end of the flange of the channel side rail may be received within said U-shaped recess.

3. The improvement described in claim 1 wherein the means for mounting the housing means includes two substantially structurally identical arms; wherein the arms are disposed in a plane which is substantially parallel to the plane of the flange of the channel side rail; and wherein the arms are spaced from each other and are arranged so that the longitudinal axis of each of the arms is disposed at an acute angle with respect to the plane of the side of the channel side rail.

4. The improvement described in claim 3 wherein the angles between the longitudinal axes of the arms and the plane of the side of the channel side rail are approximately 60°; wherein the arms are mounted on the member positioned adjacent to the lower portion of the side of the channel side rail at points spaced from the transverse longitudinal center axis of the housing means and from the ends of the housing means; and wherein the longitudinal axes of the arm intersect at a point spaced outwardly of the plane of the member positioned adjacent to the lower portion of the side of the channel side rail member.

5. The improvement described in claim 3 wherein the first member is positioned adjacent to the lower portion of the side of the channel side rail; wherein the second member is spaced outwardly, with respect to the longitudinal axis of the trailer, from the first member and thus from the side of the channel side rail; wherein the winch drum means is carried between the first member and the second member; wherein the axis of rotation of the winch drum means is substantially perpendicular to the longitudinal axis of the trailer; and wherein the second member includes an aperture, which permits access to a tool receiving portion of the winch drum means so that a tool may selectively be engaged with the tool receiving portion of the winch drum means and be utilized to rotate the winch drum means.

6. The improvement described in claim 5 wherein a side rub-rail is spaced outwardly, with respect to the longitudinal axis of the trailer, from the side of the channel side rail and is secured to the channel side rail by a plurality of stake pockets; wherein the thickness of the housing means, in a direction perpendicular to the longitudinal axis of the side rail is such that the second member of the housing means does not extend outwardly beyond the maximum permissible width clearance of the trailer; wherein the axis of rotation of the winch drum means is substantially perpendicular to the longitudinal axis of the trailer; and wherein the second member includes an aperture, which permits access to a tool receiving portion of the winch drum means so that a tool may selectively be engaged with the tool receiving portion of the winch drum means and be utilized to rotate the winch drum means.

7. The improvement described in claim 6 wherein the inner terminal end of each of the arms is generally U-shaped, in vertical cross-section, with the open end of the U-shaped recess facing outwardly toward the first side member; and wherein the distance between the first member of the housing means and the inner, closed end of said U-shaped recess is slightly greater than the width of the flange of the channel side rail and the dimensions of said U-shaped recess are such that the inner end of the flange of the channel side rail may be received within said U-shaped recess.

8. The improvement described in claim 10 wherein the arms and the first member are integral; wherein the first member and second member are welded together;

wherein the angles between the longitudinal axes of the arms and the plane of the first member are approximately 60°; wherein the arms are mounted on the first member at points spaced from the longitudinal center axis of winch drum means and from the ends of the housing means; and wherein the longitudinal axes of the arm intersect at a point spaced outwardly of the plane of first member.

* * * * *